(12) United States Patent
Minder et al.

(10) Patent No.: US 8,128,842 B2
(45) Date of Patent: Mar. 6, 2012

(54) PROCESS FOR THE PREPARATION OF AN ANTISTATIC COMPOSITION

(75) Inventors: Ernst Minder, Sissach (CH); Reto Luisoli, Hölstein (CH); Hugo Gross, Hersberg (CH)

(73) Assignee: BASF SE Ludwigshafen (DE)

( * ) Notice: Subject to any disclaimer, the term of this patent is extended or adjusted under 35 U.S.C. 154(b) by 394 days.

(21) Appl. No.: 12/310,261

(22) PCT Filed: Aug. 24, 2007

(86) PCT No.: PCT/EP2007/058790
§ 371 (c)(1),
(2), (4) Date: Feb. 18, 2009

(87) PCT Pub. No.: WO2008/025726
PCT Pub. Date: Mar. 6, 2008

(65) Prior Publication Data
US 2009/0242845 A1    Oct. 1, 2009

(30) Foreign Application Priority Data
Sep. 1, 2006 (EP) .................................. 06119954

(51) Int. Cl.
*H01B 1/00* (2006.01)
*C08F 283/00* (2006.01)
*B32B 9/00* (2006.01)
(52) U.S. Cl. ..................... 252/500; 525/418; 428/318.4
(58) Field of Classification Search .............. 427/393.1; 252/500; 428/318.4; 525/418
See application file for complete search history.

(56) References Cited

U.S. PATENT DOCUMENTS 5,478,877 A  *  12/1995  Komatsu et al. .............. 524/401
(Continued)

OTHER PUBLICATIONS

James R. Benson, "Highly Porous Polymers", Sunstorm Research Corp., American Laboratory, (Apr. 2003).

*Primary Examiner* — Mark Kopec
*Assistant Examiner* — Jaison Thomas
(74) *Attorney, Agent, or Firm* — Tyler A. Stevenson

(57) ABSTRACT

The invention relates to the preparation of an antistatic composition comprising adding a liquid or a dissolved ionic substance to a porous polymer and processing the porous polymer together with further additives and further thermoplastic polymers in the melt. The invention relates also to the antistatic composition itself and to its use for rendering polymers antistatic.

12 Claims, No Drawings

U.S. PATENT DOCUMENTS

| | | | | |
|---|---|---|---|---|
| 5,658,685 A | * | 8/1997 | Oliver | 429/303 |
| 5,965,206 A | | 10/1999 | Hilti et al. | |
| 6,986,941 B2 | * | 1/2006 | Morita et al. | 428/318.6 |
| 2003/0183810 A1 | | 10/2003 | Fujihana et al. | |
| 2006/0208232 A1 | | 9/2006 | Fujihana et al. | |

* cited by examiner

PROCESS FOR THE PREPARATION OF AN ANTISTATIC COMPOSITION

The invention relates to the preparation of an antistatic composition comprising adding a liquid or a dissolved ionic substance to a porous polymer and processing the porous polymer together with further additives and further thermoplastic polymers in the melt. The invention relates also to the antistatic composition itself and to its use for rendering polymers antistatic.

It is known that polymers are subject to a strong electrostatic charge and that charges, once applied, can be discharged only slowly because of the low electrical conductivity of polymers. Rapid discharging is required not only for aesthetic reasons but also, in many cases, for reasons of safety. The following adverse effects in use may be mentioned: soiling of polymer surfaces, electrical shocks to persons touching polymers, disruption of production caused by the adhesion of film webs, destruction of electronic components, lump formation in polymer powders, and sparking, caused by charges being too high, with subsequent ignition, which has already frequently resulted in serious explosions.

It is known to limit static charging by the addition of additives that improve surface conductivity, but such substances have the disadvantage of being ineffective in practice when atmospheric humidity is low. It is therefore better to use additives that are effective at low atmospheric humidity, which can usually be achieved by increasing the volume conductivity. The known substances for increasing volume conductivity, for example carbon black or metal powder, however, alter the mechanical properties of the polymers and cannot be used for transparent polymers. In addition, there is an increasing requirement for additives to be ecologically unobjectionable.

Further details relating to antistatic additives and the mechanism of static charging may be found, for example, in the "Plastics Additives Handbook", editors R. Gächter and H. Müller, Hanser Verlag, 3rd edition, 1990, pages 749-775.

U.S. Pat. No. 5,965,206 discloses an antistatic composition comprising a fibre-forming or fibrous organic polymeric material together with a further polymer or copolymer capable of ion conduction, which can be so incorporated into a thermoplastic or elastomeric substrate that the polymer or copolymer is substantially adsorptively bound to the fibre or dissolved in it and together with it forms a network in the thermoplastic or elastomeric substrate in which the fibre is not soluble. A portion of the polymer or copolymer capable of ion conduction has polar groups that are capable of complexing or solvating a salt of an inorganic or organic protonic acid.

The fibrous or fibre-forming organic polymeric material must be so selected that it does not dissolve in the thermoplastic or elastomeric substrate but is able to form a net-like structure of contiguous fibres.

For good electrical conductivity it is advantageous for the fibres of the organic material to be contiguous with one other or to cross one another at as many sites as possible once they have been incorporated in the polymer. By that means electrically conductive paths are formed through which the charges can flow away.

Since the fibres and the polymers or copolymers capable of ion conduction are high-molecular-weight compounds, there is also virtually no risk of their being exuded, with the result that the antistatic property is especially durable.

The stability properties of the polymer, such as thermostability and resistance to light and hydrolysis, are in most cases virtually unaffected.

When the amounts added are small, the optical properties are modified only slightly and transparent materials remain substantially transparent, which is of great importance for many fields of use.

A particularly suitable composition according to U.S. Pat. No. 5,965,206 is an antistatic mixture in the form of contiguous fibres, which mixture comprises an organic polymeric material that is fibrous or forms fibres on mixing which is selected from the group consisting of a polyacrylic acid ester, polymethacrylic acid ester, polyacrylonitrile, polyvinyl alcohol, polyvinyl acetate, polyamide, polyurethane or polyester;

a polymer or copolymer capable of ionic charge conduction that has blocks for complexing or solvating a salt of an inorganic protonic acid, which is selected from the group consisting of an oligoethoxylated acrylate or methacrylate, styrene oligoethoxylated in the para position, a polyether urethane, polyether urea, polyether amide, polyether ester amide or polyether ester; and a salt selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ or $Ca(CF_3SO_3)_2$, that has been complexed or solvated in the polymer or copolymer.

When such compositions are prepared, the mixing step between the polymer or copolymer capable of ionic charge conduction and the salt is a critical step. One possibility is mixing the ionic component, for example, a salt or ionomer with the polymer in the form of a powder and extruding the mixture. However, homogeneity of the resulting granules is not always guaranteed. Even slight inhomogeneities, however, adversely affect the final article. For example, antistatic properties are not in the desired range or color is imparted to the final product.

Surprisingly it has been found, that the ionic component can be dissolved in an appropriate solvent and mixed with a porous or micro porous polymeric material. The solution is adsorbed in the pores and the resulting material is a free flowing granulate. The granules can be mixed with other components and further processed in conventional polymer processing devices, such as mixers or extruders. When these granules are used as antistatic additive in thermoplastic or elastomeric polymers the final articles show an improved antistatic effect, lower color formation and lower polymer decomposition as compared with the conventionally added antistatic additive.

One aspect of the invention is a process for the preparation of an antistatic composition comprising mixing in the melt phase A) a polymer or copolymer capable of ionic charge conduction that has blocks for complexing or solvating a salt of an organic or inorganic acid, which is selected from the group consisting of an oligoethoxylated acrylate or methacrylate, styrene oligoethoxylated in the para position, a polyether urethane, polyether urea, polyether amide, polyether ester amide or polyether ester, B) a porous polymer selected from the group consisting of the polyolefins, polyamides, polyesters or polystyrenes containing an ionic compound in the liquid state in its pores and C) optionally an organic polymeric material that is fibrous or forms fibres on mixing The fibrous or fibre-forming organic polymeric material (C) may already be in the form of long spun fibres or in the form of cut staple fibres, and may be used in that form. It is also possible for the fibres that are present to be used in the form of a planar network, a woven pattern, a non-woven fabric or a felt.

The fibrous or fibre-forming organic polymeric material (C) is preferably in the form of synthetically produced polymer fibres.

Examples of suitable fibrous or fibre-forming organic polymeric materials are polyamides and copolyamides, polyesters, polyvinyl acetate, polyvinyl alcohol, modified cellulose, polyacrylic acid esters, polymethacrylic acid esters, polyacrylonitrile, modacryl (copolymer of acrylonitrile and vinyl chloride), polyolefins, polyanhydrides, polyester amides, polyphenylene sulfide, polyfluorohydrocarbons, polyurethane and polyurea.

For example the polymeric material (C) that is fibrous or forms fibres on mixing is a polyester, polyamide (x) or polyamide (x,y) in which x and y are each independently a number from 4 to 14.

Preferably the polymeric material (C) is a polyamide (x) or polyamide (x,y) in which x and y are each independently a number from 4 to 14.

It is more especially polyamide 4,6, polyamide 6,6, polyamide 6 or polyamide 6,12.

Preferably, the fibres comprise the polymer or copolymer capable of ion conduction at the surface or over the cross-section and they are contiguous with one another in the polymer matrix, since by that means the volume conductivity may occur by way of ions.

The fibrous organic material generally has a length of from 0.01 to 200 mm, preferably from 0.1 to 20 mm. It may be in the form of macroscopic fibres, but also small fibrils having microscopic cavities may be present.

It is also possible, however, to use the fibrous or fibre-forming organic polymeric material in the form of granules or powder. When mixing and processing with the polymeric substrate, for example in calendars, three-roll mills, extruders or kneaders, a fibrous or fibrillar alignment is achieved as a result of the fibre-forming organic polymeric material not being soluble in the substrate polymer and extending substantially in one dimension owing to the processing or mixing process. The result can, if desired, be further improved by a subsequent additional drawing process. Methods of mixing and processing thermoplastic or elastomeric polymers are known to the person skilled in the art and are described, for example, in Kunststoff-Taschenbuch, 12th edition, HanserVerlag 1979, pages 35-195.

For instance the polymer or copolymer (A) is a block copolymer polyether ester amide in which the polyether segments consist of polyethylene glycol units having a molecular weight $M_n$ of from 200 to 6000 daltons and the polyamide segments consist of polyamide (x) or polyamide (x,y) having a molecular weight $M_n$ of from 200 to 6000 daltons, x and y being a number from 4 to 14.

Suitable polyether ester amides are described, for example, in EP-A-613 919.

Other equally well suited polyether ester amides and the preparation thereof are described in DE-OS-25 23 991.

Polymers or copolymers according to the invention are commercially available or may be prepared, for example, in accordance with a process described in EP-A-613 919 or DE-OS-25 23 991.

For example the ratio by mass of organic polymeric material (C) that is fibrous or forms fibres on mixing to copolymer (A) is from 20:1 to 1:10, preferably from 5:1 to 1:5 and more preferably from 2:1 to 1:2.

Typically component (C) is present in an amount from 0 to 70 parts by weight, component (A) is present in an amount of 10 to 70 parts by weight and component (B) is present in an amount of 1 to 40 parts by weight, the sum of (A), (B) and (C) being 100 parts.

Especially the ionic compound of component (B) is a salt of an inorganic or organic acid.

For example the inorganic or organic salt is an alkali metal, alkaline earth metal, zinc or ammonium salt of an inorganic or low-molecular-weight organic protonic acid.

Organic protonic acids are, for example, those having from 1 to 30 carbon atoms. Examples are acetic acid, trifluoroacetic acid; sulfonic acids, such as methanesulfonic acid, trifluoromethanesulfonic acid, dodecylbenzene sulfonic acid, toluenesulfonic acid, alkylsulfonic acid and ether sulfonic acids.

Especially preferred are the inorganic salts $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ and $Ca(CF_3SO_3)_2$ and the organic salts Na-dodecylbenzenesulfonate, K-dodecylbenzenesulfonate, Na-toluenesulfonate, K-toluenesulfonate, Na or K alkylsulfonates, such as ATMER 190, K-ether sulfonates.

The salts may occur in various hydrated forms and may be used with or without water of hydration.

Preferably the ionic compound of component (B) is the alkaline metal salt of acetic acid, trifluoroacetic acid, methanesulfonic acid, trifluoromethanesulfonic acid, dodecylbenzene sulfonic acid, toluenesulfonic acid, alkylsulfonic acids and ether sulfonic acids, $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ and $Ca(CF_3SO_3)_2$.

Especially preferred is $NaClO_4$.

For example in component (B) the ratio by weight between the porous polymer and the ionic compound is between 10 to 1 and 1 to 10, preferably between 5 to 1 and 1 to 5 and more preferably between 2:1 and 1:2.

The ionic compound may be liquid per se or brought into solution with an appropriate solvent.

When the ionic compound is dissolved in a solvent the above ratios apply to the solution of the ionic compound.

Preferably in component (B) the ionic compound is dissolved in a solvent.

Suitable solvents are polar solvents, such as alcohol, esters and water. Water is preferred.

Preferably the weight concentration of the ionic compound in the solvent is from 10% to 90%.

For example the porous polymer is a polyolefin, polyester, polystyrene or polyamide. Polyamide is preferred.

Such porous polymers are known in the art and are widely items of commerce. The polymers are for example sold under the trade name Accurel MP from Membrana Inc.

J. R. Benson summarizes the preparation and the different chemical compositions in "Highly Porous Polymers", American Laboratory, April 2003.

In a specific embodiment of the invention there are further additives present in the process, which are selected from the group consisting of the antioxidants, process stabilizers, UV absorbers and sterically hindered amine light stabilisers.

Examples are given below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(1'-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example β-tocopherol, β3-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenyl propionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethyl butyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$-]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxy-cinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6, 6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-[2-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos 168, Ciba Specialty Chemicals Inc.), tris(nonylphenyl) phosphite,

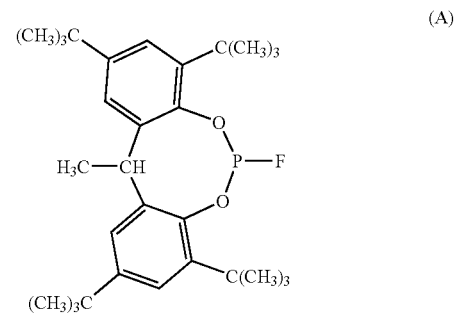

(A)

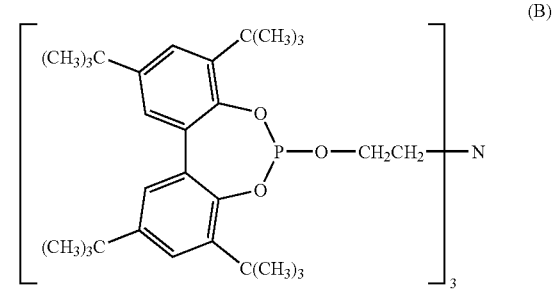

(B)

(C)

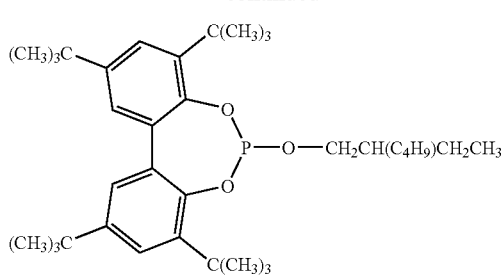

(D)

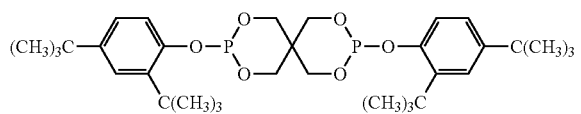

(E)

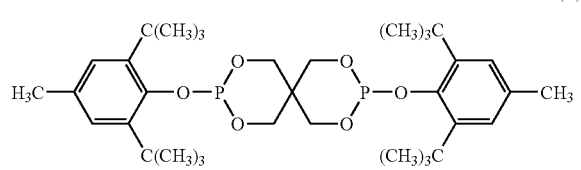

(F)

(G)

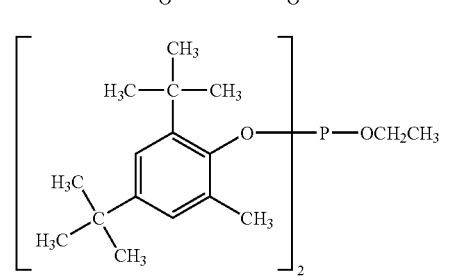

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

The mixing of the components and optionally further additives can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The process is preferably carried out in an extruder by introducing the components during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W. Knappe, H. Potente, 1989, pp. 3-7, ISBN:3-446-14339-4 (*Vol.* 2 *Extrusionsanlagen* 1986, ISBN 3-446-14329-7).

For example, the screw length is 1-60 screw diameters, preferably 20-48 screw diameters. The rotational speed of the screw is preferably 1-800 rotations per minute (rpm), very particularly preferably 25-400 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

Another aspect of the invention is a composition comprising

A) a polymer or copolymer capable of ionic charge conduction that has blocks for complexing or solvating a salt of an organic or inorganic acid, which is selected from the group consisting of an oligoethoxylated acrylate or methacrylate, styrene oligoethoxylated in the para position, a polyether urethane, polyether urea, polyether amide, polyether ester amide or polyether ester, B) a porous polymer selected from the group consisting of the polyolefins, polyamides, polyesters or polystyrenes containing an ionic compound in the liquid state in its pores and C) optionally an organic polymeric material that is fibrous or forms fibres on mixing Yet a further aspect of the invention is the use of a composition as defined above as antistatic additive in thermoplastic or elastomeric polymers.

Definitions and preferences defined above apply also for the other aspects of the invention.

Suitable polymers, which can be provided with antistatic properties are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The polymers provided with antistatic properties according to the invention are suitable especially for wire coverings and cable insulations. Decorative films, foamed materials, agricultural fleece, tubes, sealing profiles and office films may, however, also be produced. The polymer compositions according to the invention may also be used as moulding compositions for the production of hollow articles (bottles) packaging films (deep-drawn film), blown films, crash pad films (automobiles), pipes, foamed materials, heavy-duty profiles (window frames), profiles for illuminated walls, building profiles, sidings, fittings, office films and apparatus housings (computers, domestic appliances).

The following examples illustrate the invention.

EXPERIMENTAL

Materials

Polyether ester amide Pebax MV 1074 from Arkema
Sodium Perchlorate
Irganox 1010 phenolic antioxidans from Ciba Specialty Chemicals
Irgafos 168 phosphite stabilizer from Ciba Specialty Chemicals Polyamide 6
Porous Polyamide 6
Compounding
Comparative Formulation (C1)

| Polyamide 6 as powder | Powder premix | 48.0 parts |
| --- | --- | --- |
| IRGANOX 1010 ® | | 0.1 part |
| IRGAFOS 168 ® | | 0.1 part |
| Sodium-Perchlorate | | 1.7 parts |
| Polyether ester amide | Granulate | 50.1 parts |

The powder premix is prepared by mixing the components in a commercial mixer.

The powder premix and the polyether ester amide are compounded in a twin screw extruder at 230° C. and finally granulated and dried.
Formulation According to the Invention Example 1

| Polyamide 6 | Granulate | 42.2 parts |
| --- | --- | --- |
| IRGANOX 1010 | Powder | 0.1 part |
| IRGAFOS 168 | Powder | 0.1 part |
| Sodium-Perchlorate as 50% aqueous solution in porous Polyamide 6 (solution/polyamide 6 40/60) 40% | Granulate | 8.4 parts containing 5 parts polyamide, 1.7 parts sodium perchlorate 1.7 parts water, which is removed during compounding |
| Polyether ester amide | Granulate | 49.2 parts |

All components are dosed to a twin screw extruder and compounded at a temperature of 230° C., subsequently granulated and dried.
Surface and Volume Resistivity Measurement The resulting granules are compression molded at 230° C. The sample size is 10×14×0.1 cm.

From each experiment two plaques were molded and tested. The samples were conditioned and measured at 50±5% relative humidity (r.h.) and 23±2° C.

The measurement is carried out with a ring electrode, diameter $D_1$: 50 mm, $D_2$: 60 mm, slit 5 mm, electrode constant: 34.56, test voltage 50 V.

On every plaque surface and volume resistivity are measured on both plaques and both sides of the plaques. The given values are the average out of this.
Intrinsic Viscosity Before the intrinsic viscosity measurement the samples are dried overnight at 80° C. and vacuum. The intrinsic viscosity is determined in m-cresol at room temperature with a AVS 400 viscometer from Schott. The MVR is determined according to ISO1133 at 230° C., 2.16 kg. The results are the average of two single measurements.

Melt Volume Rate (MVR)

Before the MVR measurement the samples were dried overnight with 80° C. and vacuum. The MVR was determined according to ISO1133 at 230° C., 2.16 kg. The results are the average of two single measurements.

Yellowness Index

The YI was measured on the pellets. The measurement is done according to DIN 6167.

Melt Volume Rate (MVR)
Results

| Sample | Surface Resistivity @ 50 Volts [ohm/sq.] | Volume Resistivity @ 50 Volts [ohm × cm] | Relative Intrinsic Viscosity ($T/T_0$) | YI | MVR 230° C./2.16 kg [ml/10 min] |
| --- | --- | --- | --- | --- | --- |
| Example 1 | 5E+07 | 5E+07 | 1.83 | 29.6 | 19.0 |
| Comparative Example | 9E+07 | 5E+07 | 1.77 | 37.9 | 26.8 |
| Comparative Example | 1E+08 | 5E+07 | 1.76 | 40.1 | 26.1 |

The higher viscosity of the example 1 can be explained with less decomposition during production. The lower YI is another indication for less decomposition.

Surface resistivity and yellowness index are lower (better) as compared to the comparative experiments.

The invention claimed is:

1. A process for the preparation of an antistatic composition comprising mixing in the melt phase
   A) a polymer or copolymer capable of ionic charge conduction that has blocks for complexing or solvating a salt of an organic or inorganic acid, which is selected from the group consisting of an oligoethoxylated acrylate or methacrylate, styrene oligoethoxylated in the para position, a polyether urethane, polyether urea, polyether amide, polyether ester amide and a polyether ester,
   B) a porous polymer selected from the group consisting of polyolefins, polyamides, polyesters and polystyrenes containing an ionic compound dissolved in a solvent in its pores and
   C) optionally an organic polymeric material that is fibrous or forms fibres on mixing.

2. A process according to claim 1, wherein the polymeric material (C) is present and is a polyester, polyamide (x) or polyamide (x,y) in which x and y are each independently a number from 4 to 14.

3. A process according to claim 1, wherein the polymer or copolymer (A) is a block copolymer polyether ester amide in which the polyether segments consist of polyethylene glycol units having a molecular weight $M_n$ of from 200 to 6000 daltons and the polyamide segments consist of polyamide (x) or polyamide (x,y) having a molecular weight $M_n$ of from 200 to 6000 daltons, x and y being a number from 4 to 14.

4. A process according to claim 1, wherein the ratio by mass of organic polymeric material (C) that is fibrous or forms fibres on mixing to copolymer (A) is from 20:1 to 1:10.

5. A process according to claim 1, wherein component (C) is present in an amount from 0 to 70 parts by weight, component (A) is present in an amount of 10 to 70 parts by weight and component (B) is present in an amount of 1 to 40 parts by weight, the sum of (A), (B) and (C) being 100 parts.

6. A process according to claim 1 wherein the ionic compound of component (B) is a salt of an inorganic or organic acid.

7. A process according to claim 6 wherein the ionic compound of component (B) is selected from the group consisting of an alkaline metal salt of acetic acid, trifluoroacetic acid, methanesulfonic acid, trifluoromethanesulfonic acid, dodecylbenzene sulfonic acid, toluenesulfonic acid, alkylsulfonic acids or ether sulfonic acids, $LiClO_4$, $LiCF_3SO_3$, $NaClO_4$, $LiBF_4$, $NaBF_4$, $KBE_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ and $Ca(CF_3SO_3)_2$.

8. A process according to claim 1 wherein in component (B) the ratio by weight between the porous polymer and the ionic compound is between 10 to 1 and 1 to 10.

9. A process according to claim 1 wherein the weight concentration of the ionic compound in the solvent is from 10% to 90%.

10. A process according to claim 1 wherein the porous polymer is a polyolefin or a polyimide.

11. A process according to claim 1 comprising mixing further additives selected from the group consisting of antioxidants, process stabilizers, UV absorbers and sterically hindered amine light stabilisers.

12. A composition comprising
A) a polymer or copolymer capable of ionic charge conduction that has blocks for complexing or solvating a salt of an organic or inorganic acid, which is selected from the group consisting an oligoethoxylated acrylate or methacrylate, styrene oligoethoxylated in the para position, a polyether urethane, polyether urea, polyether amide, polyether ester amide and a polyether ester,
B) a porous polymer selected from the group consisting of polyolefins, polyamides, polyesters and polystyrenes containing an ionic compound dissolved in a solvent in its pores and
C) optionally an organic polymeric material that is fibrous or forms fibres on mixing.

* * * * *